US006981421B2

(12) United States Patent
Palmer et al.

(10) Patent No.: US 6,981,421 B2
(45) Date of Patent: Jan. 3, 2006

(54) PRESSURE GAGE AND SWITCH

(75) Inventors: Brian L. Palmer, Michigan City, IN (US); Daniel A. Heuer, New Carlisle, IN (US); Ronald R. Krueger, Michigan City, IN (US)

(73) Assignee: Dwyer Instruments, Inc., Michigan City, IN (US)

( * ) Notice: Subject to any disclaimer, the term of this patent is extended or adjusted under 35 U.S.C. 154(b) by 1 day.

(21) Appl. No.: 10/855,119

(22) Filed: May 27, 2004

(65) Prior Publication Data

US 2004/0237660 A1 Dec. 2, 2004

Related U.S. Application Data

(60) Provisional application No. 60/474,138, filed on May 29, 2003.

(51) Int. Cl.
*G01L 9/11* (2006.01)
(52) U.S. Cl. ....................................... 73/735
(58) Field of Classification Search .......... 73/715–728, 73/732–743

See application file for complete search history.

(56) References Cited

U.S. PATENT DOCUMENTS

| 4,347,744 | A |   | 9/1982 | Buchanan |
|-----------|---|---|--------|----------|
| 4,667,514 | A | * | 5/1987 | Baer ........................... 73/386 |
| 6,089,098 | A |   | 7/2000 | Tylisz et al. |
| 6,510,741 | B2 |   | 1/2003 | Condrea et al. |
| 6,854,335 | B1 | * | 2/2005 | Burns ........................... 73/728 |

* cited by examiner

*Primary Examiner*—William Oen
(74) *Attorney, Agent, or Firm*—Barnes & Thornburg LLP

(57) ABSTRACT

A pressure gage adapted to provide a mechanical indication of a sensed pressure and to provide an electrical signal indicative of the sensed pressure. The pressure gage includes a housing having a first fluid pressure chamber, a second fluid pressure chamber, and flexible diaphragm separating the first fluid pressure chamber from the second fluid pressure chamber. A magnet is coupled to the diaphragm such that movement of the diaphragm causes a related movement of the magnet. A helix is located adjacent to the magnet and a pointer is attached to the helix for conjoint rotation with a helix about a rotational axis. A Hall effect sensor is also located adjacent the magnet. Movement of the magnet in response to movement of the diaphragm rotates the helix and the pointer to provide a mechanical indication of the pressure sensed by the diaphragm, and the movement of the magnet causes the Hall effect sensor to generate an electrical signal indicative of the pressure sensed by the diaphragm.

19 Claims, 8 Drawing Sheets

PRESSURE GAGE AND SWITCH

RELATED APPLICATIONS

This application claims the benefit of U.S. Provisional Application No. 60/474,138, filed May 29, 2003.

BACKGROUND OF THE INVENTION

The present invention is directed to a pressure gage for measuring, indicating and controlling positive, negative or differential fluid pressures, and in particular to a pressure gage including a magnet coupled to a diaphragm, wherein movement of the magnet in response to pressure changes sensed by the diaphragm provides mechanical movement of a pointer to indicate the sensed pressure or pressure differential, and movement of the magnet creates a change in a magnetic field sensed by a Hall effect sensor wherein the output signal from the Hall effect sensor is connected to one or more switching relays for controlling associated devices in response to sensed pressure changes.

Pressure gages such as that disclosed in U.S. Pat. No. 4,347,744 of Dwyer Instruments, Inc., the assignee of the invention described herein, have been used to measure fluid pressure by the use of a flexible diaphragm that is coupled to a magnet. The magnet moves in response to changes in the differential pressure sensed by the diaphragm, and the movement of the magnet caused rotation of a double-flanged helix which in turn rotated the dial pointer of the gage to indicate the sensed pressure. The combination of a magnet and a Hall effect sensor has been used to sense changes in pressure in a differential pressure switch, such as in U.S. Pat. No. 6,089,098 of Dwyer Instruments, Inc. However, such differential pressure switches do not provide a mechanical reading of the pressure being sensed. Prior pressure gages have also detected when a sensed pressure is at or above, or is at or below, a selected pressure set point by the use of a photo interrupter that senses the position of the mechanical pointer of the gage. Such an arrangement requires a relatively complex and costly mechanical arrangement.

The pressure gage of the present invention is designed specifically for measuring low fluid pressures and small differential pressures. Such pressure gages are therefore occasionally subject to overpressure situations which can damage the diaphragm and other components of the gage. In addition, when a magnet is used in connection with a Hall effect sensor, an overpressure situation could cause the magnet to move past the Hall effect sensor to create a situation where the Hall effect sensor incorrectly indicates a sensed pressure or indicates that no pressure or differential pressure is being sensed. Consequently the Hall effect sensor may signal a switch to activate an associated device when it should not. There has consequently been a need to provide a gage wherein such consequences of an overpressure situation can be minimized or eliminated.

SUMMARY OF THE INVENTION

A pressure gage adapted to provide a mechanical indication of a sensed pressure and to provide an electrical signal indicative of the sensed pressure. The pressure gage includes a first inlet port adapted to be placed in fluid communication with a first fluid source and a second inlet port adapted to be placed in fluid communication with a second fluid source. The pressure gage includes a housing including a first fluid pressure chamber in fluid communication with the first inlet port and a second fluid pressure chamber in fluid communication with the second inlet port. A flexible diaphragm separates the first fluid pressure chamber from the second fluid pressure chamber. A magnet is attached to a free end of a leaf spring and the leaf spring is attached to the diaphragm by a linkage such that the magnet is coupled to the diaphragm. Movement of the diaphragm, due to pressure differences in the fluids in the first and second fluid pressure chambers, causes a related movement of the magnet. A helix is located adjacent to the magnet and is adapted to rotate about a rotational axis. A pointer is attached to the helix for conjoint rotation with the helix about the rotational axis. A Hall effect sensor is located adjacent the magnet, such that the magnet is located between the helix and the Hall effect sensor. Movement of the magnet is response to movement of the diaphragm rotates the helix and the pointer to provide a mechanical indication of the pressure sensed by the diaphragm. The movement of the magnet also causes the Hall effect sensor to generate an electrical signal indicative of the pressure sensed by the diaphragm.

A benefit of the use of the movement of the same magnet to drive both the mechanical and electrical components of the device, allows one to use the mechanical indicators to zero calibrate the device, as well as to set the span calibration. This direct coupling between the mechanical indicator and the electronics, is not found in the prior art.

BRIEF DESCRIPTION OF THE DRAWING FIGURES

DETAILED DESCRIPTION OF THE PREFERRED EMBODIMENT

Figure 1:
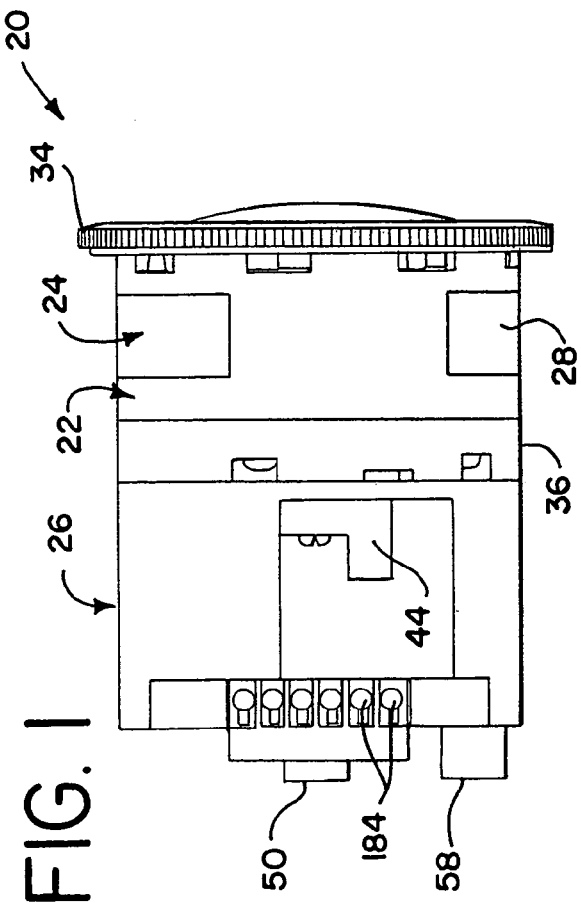
FIG. 1 is a side elevational view of the pressure gage of the present invention.

The pressure gage 20 includes a housing 22. The housing 22 includes a gage head assembly 24 that is attached to a gage body housing 26. The head assembly 24 includes a gage head housing 28 having a first end 30 and a second end 32. A cover 34 having a clear lens is attached to the first end 30 of the head housing 28. The head assembly 24 also includes a back plate 36 attached to the second end 32 of the head housing 28. The body housing 26 is attached to the back plate 36.

Figure 2:
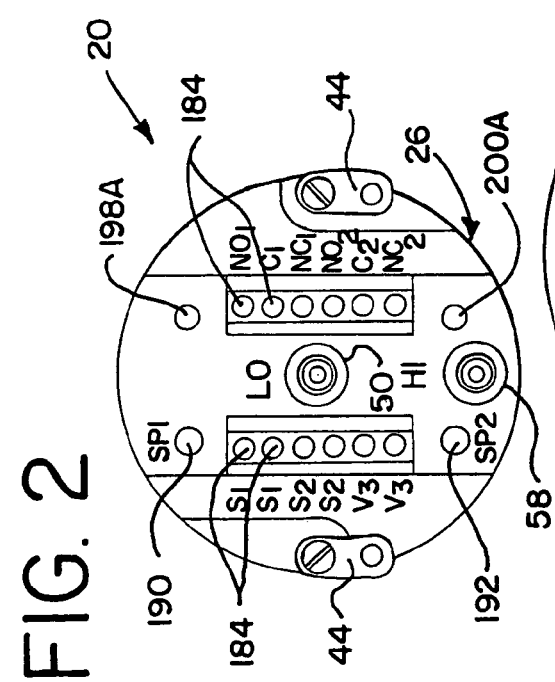
FIG. 2 is a rear elevational view of the pressure gage.
Figure 3:
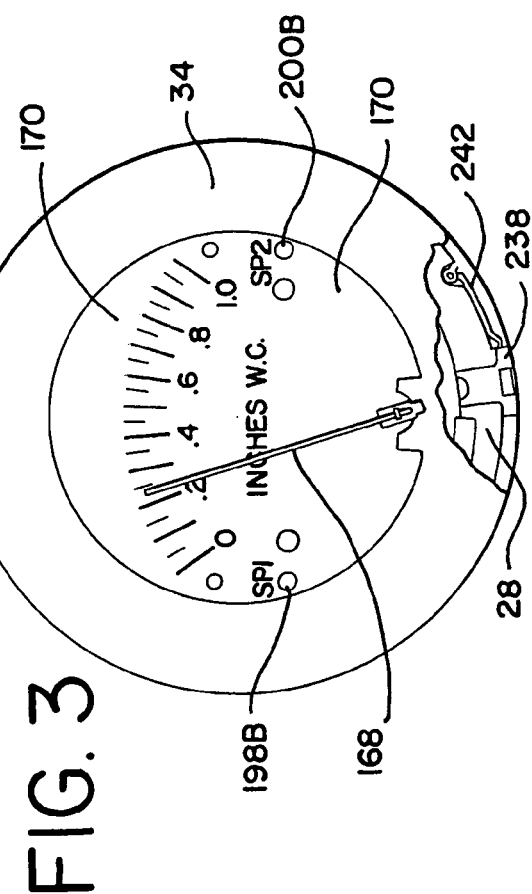
FIG. 3 is a front elevational view of the pressure gage with a portion of the front cover partially removed.
Figure 6:
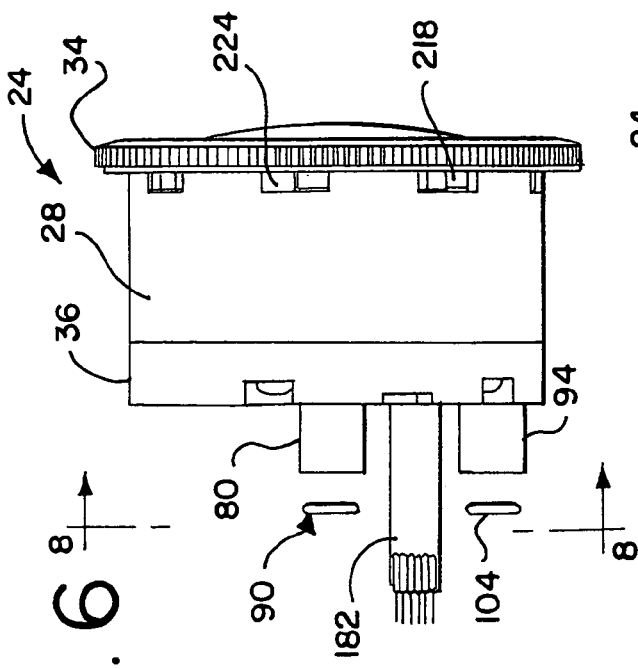
FIG. 6 is a partially exploded side elevational view of the cover, gage head housing and back plate of the gage.
Figure 8:
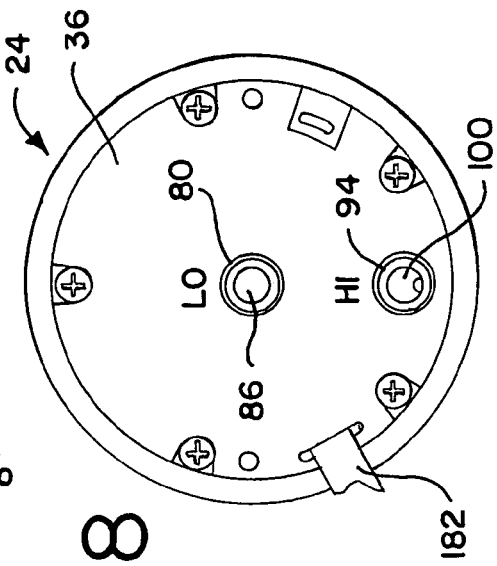
FIG. 8 is a rear elevational view taken along line 8—8 of FIG. 6.
Figure 5:
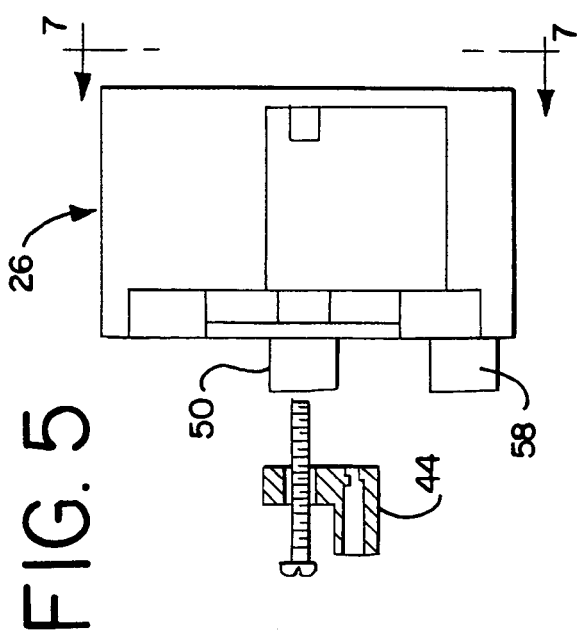
FIG. 5 is a side elevational view of the gage body housing.
Figure 7:
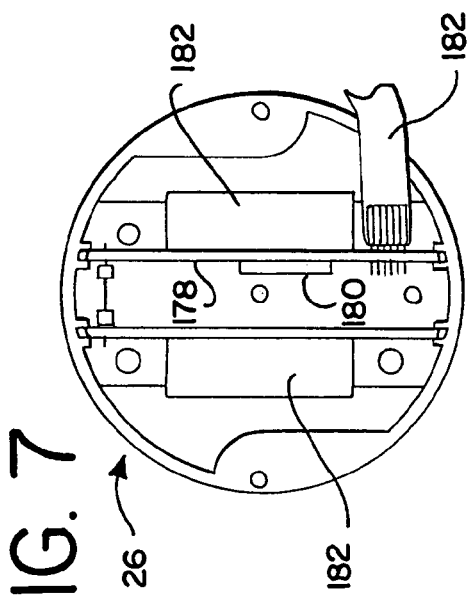
FIG. 7 is a front elevational view taken along line 7—7 of FIG. 5.

The body housing 26 as best shown in FIGS. 1 and 2, includes a pair of connector members 44 for removably mounting the pressure gage 20 to a panel or other stationary structure. Each connector member 44 is pivotally attached at one end to the body housing 26 by a fastener. The second end of each connector member 44 includes a bore adapted to receive a fastener for connecting the gage 20 to the stationary structure. The connector members 44 can be pivoted inwardly within the outer circumference of the body housing 26 to enable the gage 20 to be inserted through a circular aperture in an panel. Once the body housing 26 is fully inserted into the panel, the connector members 44 can be pivoted outwardly for connection to the panel.

Figure 9:
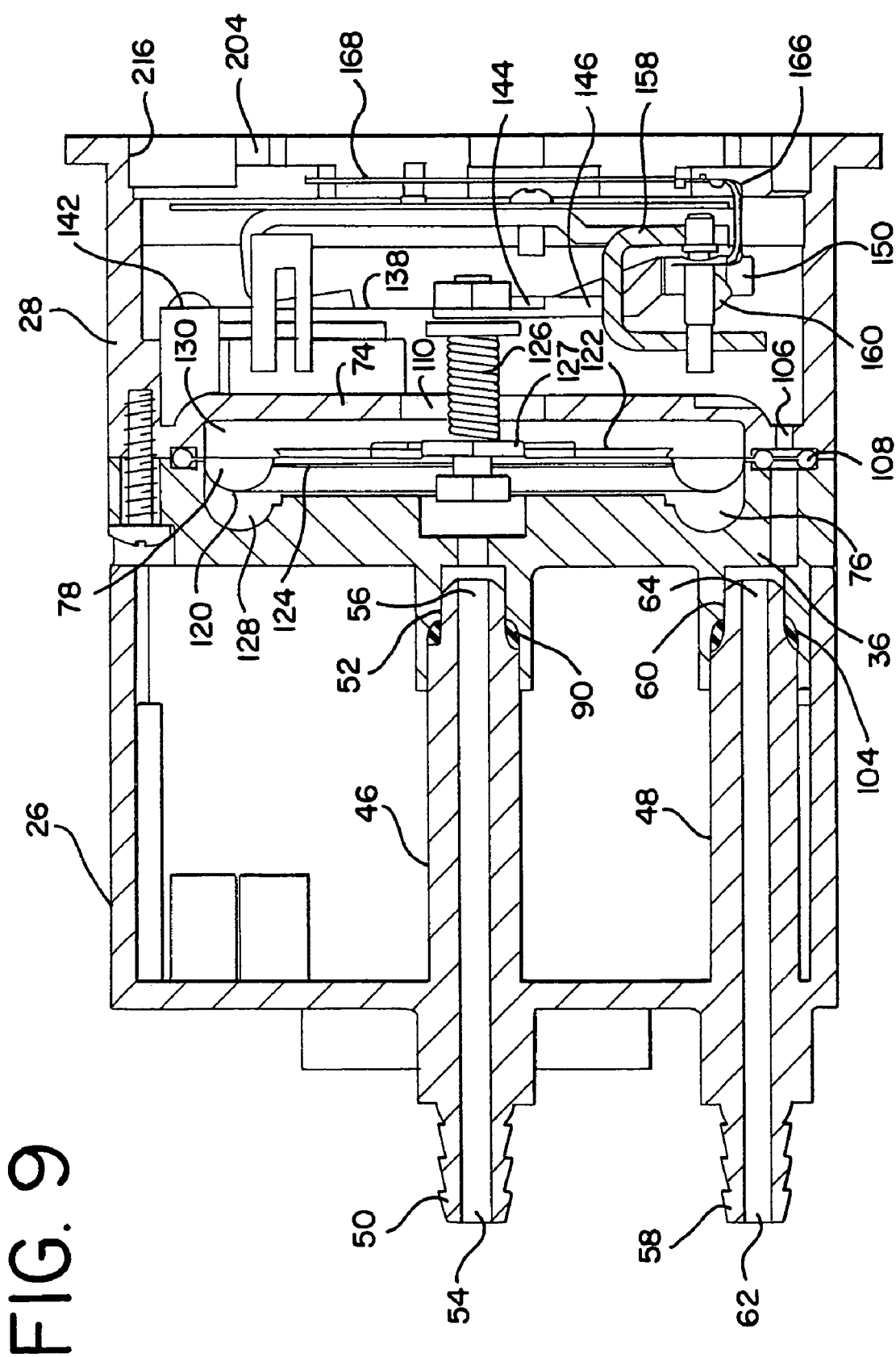
FIG. 9 is a cross sectional view of the gage with the cover removed.

The body housing 26, as best shown in FIGS. 2 and 9, includes a centrally located first fluid conduit 46, and a second fluid conduit 48 located generally radially outwardly from the first fluid conduit 46. The first fluid conduit 46 extends generally linearly between a first end 50 and a second end 52. The first end 50 includes an inlet port 54 and the second end 52 includes an outlet port 56. The second fluid conduit 48 extends generally linearly between a first end 58 and a second end 60. The first end 58 includes an inlet port 62 and the second end 60 includes an outlet port 64. As shown in FIGS. 1 and 2, the inlet ends 50 and 58 of the fluid conduits 46 and 48 may include threaded connecter members, or alternatively as shown in FIG. 9 they may include barbed connector members. The inlet port 54 of the first fluid conduit 46 is adapted to be connected in fluid communication with a source of a first fluid, such as a gas, having a first pressure, and the inlet port 62 of the second fluid conduit is adapted to be attached in fluid communication with a source of a second fluid, such as a gas, having a second pressure. The pressure of the first fluid connected to the inlet 54 of the first fluid conduit 46 is typically relatively lower than the pressure of the second fluid connected to the inlet port 62 of the second fluid conduit 48. If desired, the inlet port 54 or the inlet port 62 can be in fluid communication with the atmosphere.

Figure 10:
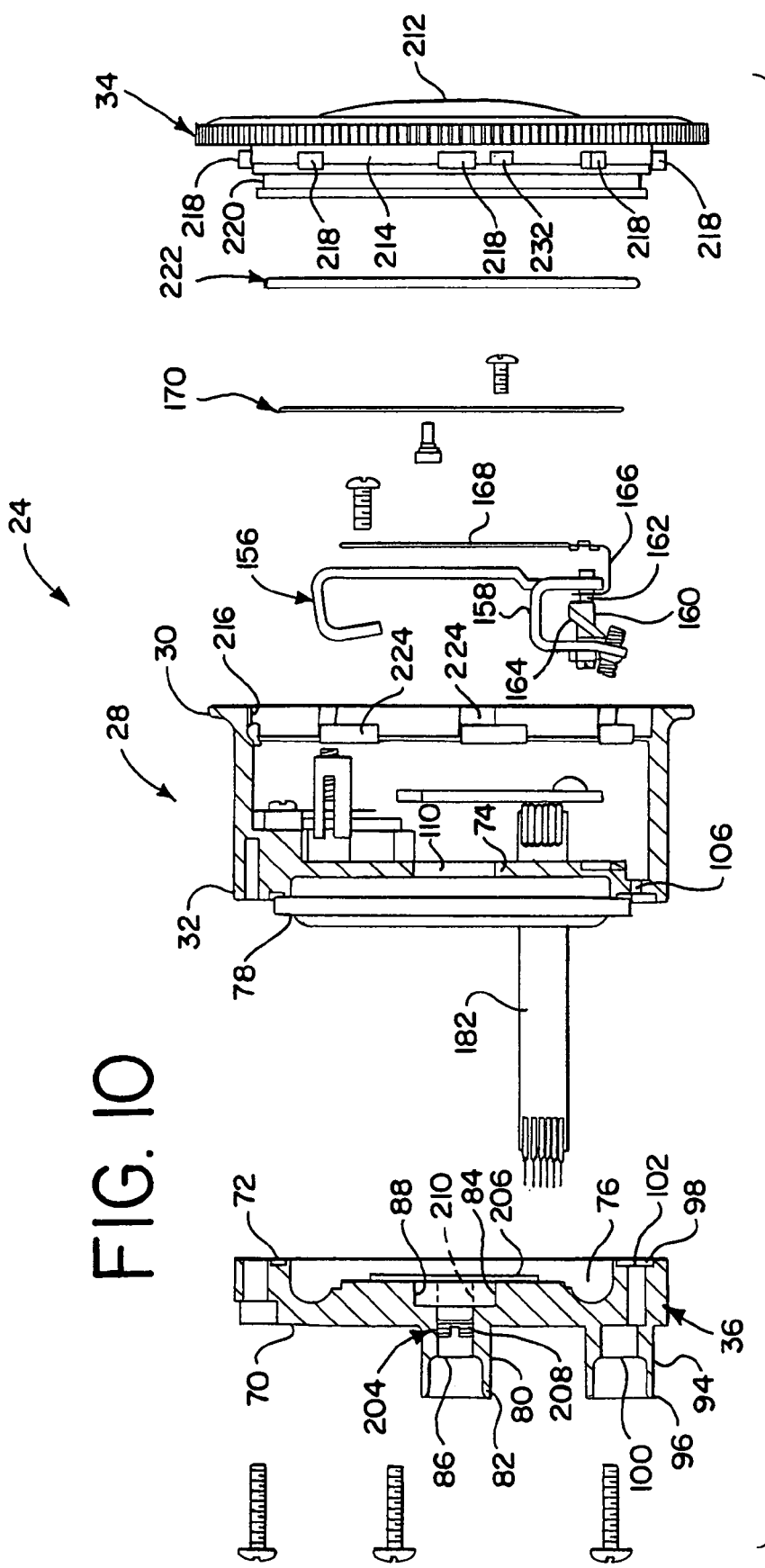
FIG. 10 is an exploded view of the gage head assembly.

As best shown in FIG. 10, the back plate 36 includes a first end 70 and a second end 72. The second end 72 of the back plate 36 is attached to the second end 32 of the head housing 28. The head housing 28 includes an internal wall 74. The head assembly 24 includes a fluid cavity 76 formed between the internal wall 74 of the head housing 28 and the back plate 36. The fluid cavity 76 includes a diaphragm assembly 78. The back plate 36 includes a first fluid conduit 80 having a first end 82 and a second end 84. The first end 82 includes an inlet port 86 and the second end 84 includes an outlet port 88. The first end 82 of the fluid conduit 80 is adapted to be connected to the second end 52 of the first fluid conduit 46 of the body housing 26 by a resilient elastomeric seal member 90, such as an O-ring, such that the inlet port 54 is in fluid communication with the inlet port 86. The back plate 36 also includes a second fluid conduit 94 having a first end 96 and a second end 98. The first end 96 includes an inlet port 100 and the second end 98 includes an outlet port 102. The first end 96 of the second fluid conduit 94 is adapted to be connected to the second end 60 of the second fluid conduit 48 of the body housing 26 by a seal member 104, such as an O-ring, such that the inlet port 62 is in fluid communication with the inlet port 100. The head housing 28 also includes a fluid conduit 106 that is connected in fluid communication with the outlet port 102 of the second fluid conduit 94 of the back plate 36 by a generally annular seal member 108. The fluid conduit 106 is in fluid communication with a central aperture 110 in the internal wall 74 of the head housing 28. The central aperture 110 in the internal wall 74 is thereby in fluid communication with the inlet port 62 of the body housing 26.

A diaphragm assembly 78 is located within the fluid cavity 76. The diaphragm assembly is constructed as generally described in U.S. Pat. No. 4,347,744 of Dwyer Instruments, Inc., which is incorporated herein by reference. The diaphragm assembly 78 includes a flexible diaphragm 120 and plates 122 and 124 that are located on opposite sides of the diaphragm 120. The plates 122 and 124 are connected to the diaphragm 120 by a linkage 126 that extends through the plates 122 and 124 and the diaphragm 120. The diaphragm 120 thereby divides the fluid cavity 76 into a first fluid pressure chamber 128 that is in fluid communication with the inlet port 86 of the back plate 36 and the inlet port 54 of the body housing 26, and a second fluid pressure chamber 130 that is in fluid communication with the central aperture 110 of the internal wall 74 of the head housing 28, the inlet port 62 of the back plate 36, and the inlet port 62 of the body housing 26. The linkage 126 is constructed and operates as also generally disclosed in U.S. Pat. No. 4,347,744 which is incorporated herein by reference.

The head housing 28 includes a range spring 138. The range spring 138 includes a leaf spring 140 having a first end 142 mounted to the head housing 28 such that the leaf spring 140 extends outwardly from the first end 142 in a cantilevered manner generally parallel to the diaphragm 120. The leaf spring 140 includes a second end 144 to which a bracket 146 is attached. The second end 144 of the leaf spring 140 is connected to the diaphragm 120 by the linkage 126. The free end of the bracket 146 includes a magnet 150. A change in the differential pressure between the pressure of the fluid within the first fluid pressure chamber 128 and the pressure of the fluid within the second fluid pressure chamber 130, will cause a transverse movement of the diaphragm 120, which in turn will cause a corresponding movement of the range spring 138 through the linkage 126. Movement of the diaphragm 120 will thereby cause movement of the magnet 150 at the free end of the range spring 138.

A mounting frame 156 having a generally U-shaped bracket 158 is attached to the head housing 28. A helix 160 includes a shaft that is rotatably mounted at each end to a respective leg of the U-shaped bracket 158. The helix 160 includes a helical flange 164 that extends in a helical manner about the shaft 162 for one half of a turn. The helical flange 164 includes a helical edge. A generally U-shaped frame 166 is attached at one end to the helix 160 for conjoint rotation therewith. An elongate linear pointer 168 is attached at the second end of the frame 166. The frame 166 acts as a counterweight to balance the mass of the pointer 168 which is offset from the central rotational axis of the helix 160, such that the frame 166 and pointer 168 do not inhibit rotation of the helix 160 about its axis.

Figure 13:
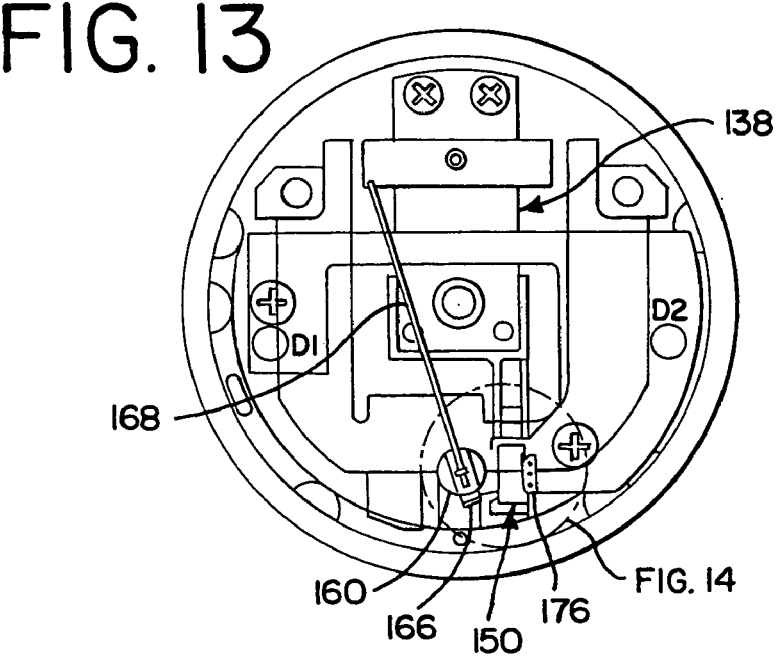
FIG. 13 is a front elevational view of the gage head housing.
Figure 14:
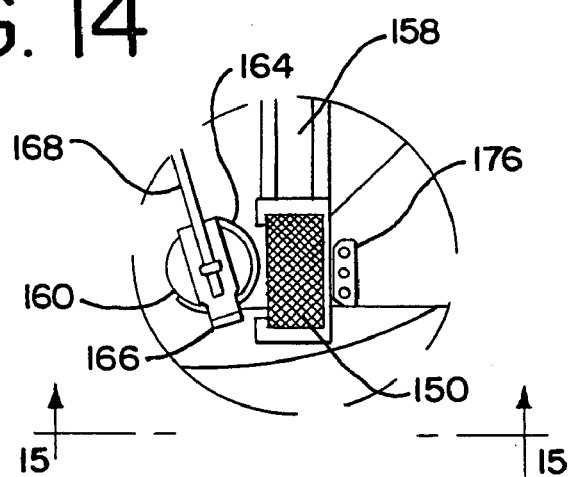
FIG. 14 is an enlarged detail view of the pointer, helix, magnet and Hall effect sensor sensing arrangement.
Figure 15:
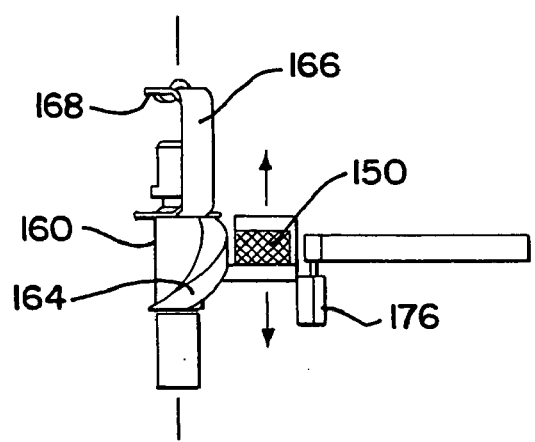
FIG. 15 is a bottom view of the sensing arrangement taken along line 15—15 of FIG. 14.

As best shown in FIGS. 13 and 14, a pole of the magnet 150 is located closely adjacent to the helical flange 164 of the helix 160. Movement of the magnet 150 in response to a movement of the diaphragm 120, due to a sensed change in differential pressure between the chambers 128 and 130, causes the magnet 150 to move substantially parallel to the rotational axis of the helix 160, although the movement of the magnet 150 may be in a very shallow arc. Movement of the magnet 150 causes the helix 160 and pointer 168 to rotate about the rotational axis of the helix 160 due to the magnetic field that couples the helical flange 164 of the helix 160 to the magnet 150. The pointer 168 indicates the differential pressure sensed by the diaphragm 120 on a face plate 170 that includes a graduated scale. The magnet 150 and pointer 168 thereby provide a mechanical indication of a pressure sensed by the diaphragm 120 through generally linear movement of the magnet 150 and resulting rotational movement of the helix 160 and pointer 168.

A Hall effect sensor 176 is mounted to the head housing 28 in close proximity to the magnet 150 as best shown in FIG. 14. The magnet 150 is thereby disposed between the helix 160 and the Hall effect sensor 176. A preferred Hall effect sensor 176 is Model No. SS495A as manufactured by Microswitch. A printed circuit board 178 having a microprocessor 180 is located within the head housing 28. The printed circuit board 178 and microprocessor 180 are located within the body housing 26. The Hall effect sensor 176 is connected to the circuit board 178 by appropriate wiring 182. A preferred microprocessor is Model No. PIC16F72ISS as manufactured by Microchip. The circuit board 178 is electrically connected to switching relays 182 having a plurality of electrical contacts 184. A preferred switching relay is Model No. G6RN-1-24 as manufactured by Omron. The electrical contacts 184 can be electrically connected to any desired device or devices that are to be controlled by the pressure gage 20.

A first pressure set point push button switch 190 and a second pressure set point push button switch 192 are located on the rear surface of the body housing 26. The push button switches 190 and 192 are electrically connected to the circuit board 178. A preferred push button switch is Model No. SF250Q as manufactured by E-Switch. The first push button switch 190 is manually activated to select a first pressure setting to be sensed by the pressure gage 20 at which pressure setting the switching relays 182 will send a signal to an associated device to control the operation of the associated device. Similarly, the second push button switch is manually activated to select a second pressure setting to be sensed by the gage 20 whereupon the switching relays 182 send a second signal to an associated device or devices for control thereof, for example, to open or close a valve or damper. The gage 20 includes a first set of pressure point indicators 198A–B, in the form of light emitting diodes (LEDs), and second set of pressure set point indicators 200A–B, also in the form of LEDs. The pressure set point indicators 198A and 200A are located on the rear surface of the body housing 26. The pressure set point indicators 198B and 200B are located adjacent the face plate 170. The pressure set point indicators 198A and B indicate when the gage 20 senses the pressure that was selected by actuation of the first push button switch 190. The pressure set point indicators 200A and B indicate when the gage 20 senses the pressure that was selected by actuation of the second push button switch 192.

The Hall effect sensor 176 senses and responds to the changes in the magnetic field between the Hall effect sensor 176 and the magnet 150 due to changes in position between the Hall effect sensor 176 and the magnet 150. The Hall effect sensor 176 thereby detects the position of the magnet 150 with respect thereto and thereby also detects changes in position of the diaphragm 120. The Hall effect sensor 176 sends a electrical signal to the printed circuit board 178 on which is mounted components of the electrical subsystem, including the microprocessor 180. The electrical signal is indicative of the differential pressure sensed by the diaphragm 120. The Hall effect sensor 176 thereby provides an output signal that corresponds to the pressure sensed by the gage 20 and as mechanically indicated by the pointer 168. The mechanically sensed pressure display as provided by the pointer 168, and the electronically sensed pressure signals as provided by the Hall effect sensor 176 are both generated by the movement of the magnet 150 and the respective magnetic coupling of the magnet 150 to the helix 160 and also to the Hall effect sensor 176.

Figure 16:
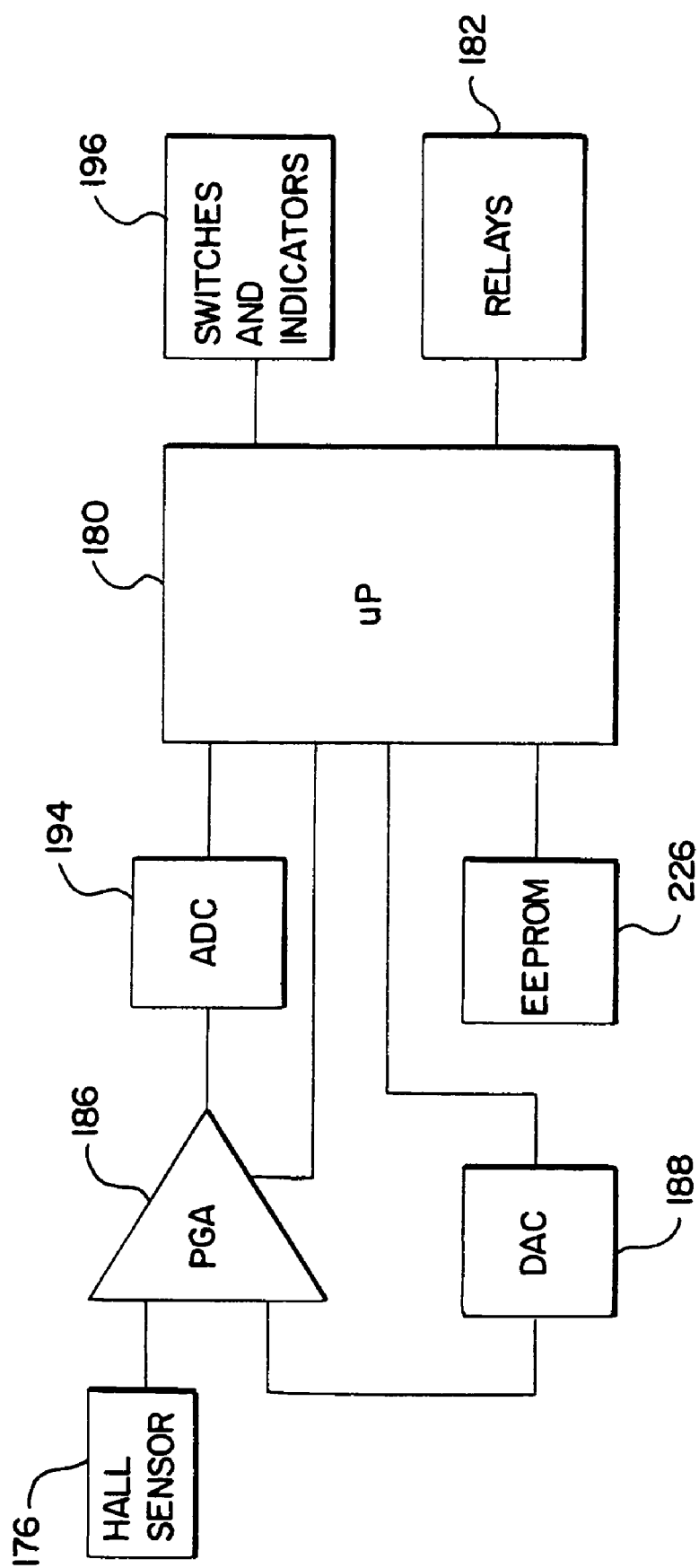
FIG. 16 is a diagram showing the major components of the electronic subsystem of the gage.

In general, the pressure gage electronic subsystem includes a Hall effect sensor 176, a programmable gain amplifier stage (PGA) 186, an offset zero digital to analog converter (DAC) 188, an analog to digital converter (ADC) 194, a microprocessor 180, an EEPROM 226, and switches and indicators 196, and relays 182 as shown in FIG. 16. One skilled in the art will recognize that equivalent electronic structures exist and can be substituted for the components above. For instance, other memory storage structures could be substituted for the EEPROM 226 without detracting from the scope of the invention. Similarly, the microprocessor could include the digital to analog converter 188 and the analog to digital converter 194.

The PGA stage 186 amplifies the signal generated by the Hall sensor 176. It also combines the output of the DAC 188, which controls the zero calibration of the gage. The output of the PGA stage 186 is fed to the ADC 194. The output of the ADC 194 is supplied to inputs of the microprocessor 180. The microprocessor 180 also receives output from switches 196 to determine the state of the system and controls the relays 182 and indicators 196 as necessary to fulfill the system functions. Calibration and configuration settings are stored in a nonvolatile memory such as an EEPROM 226.

Figure 17:
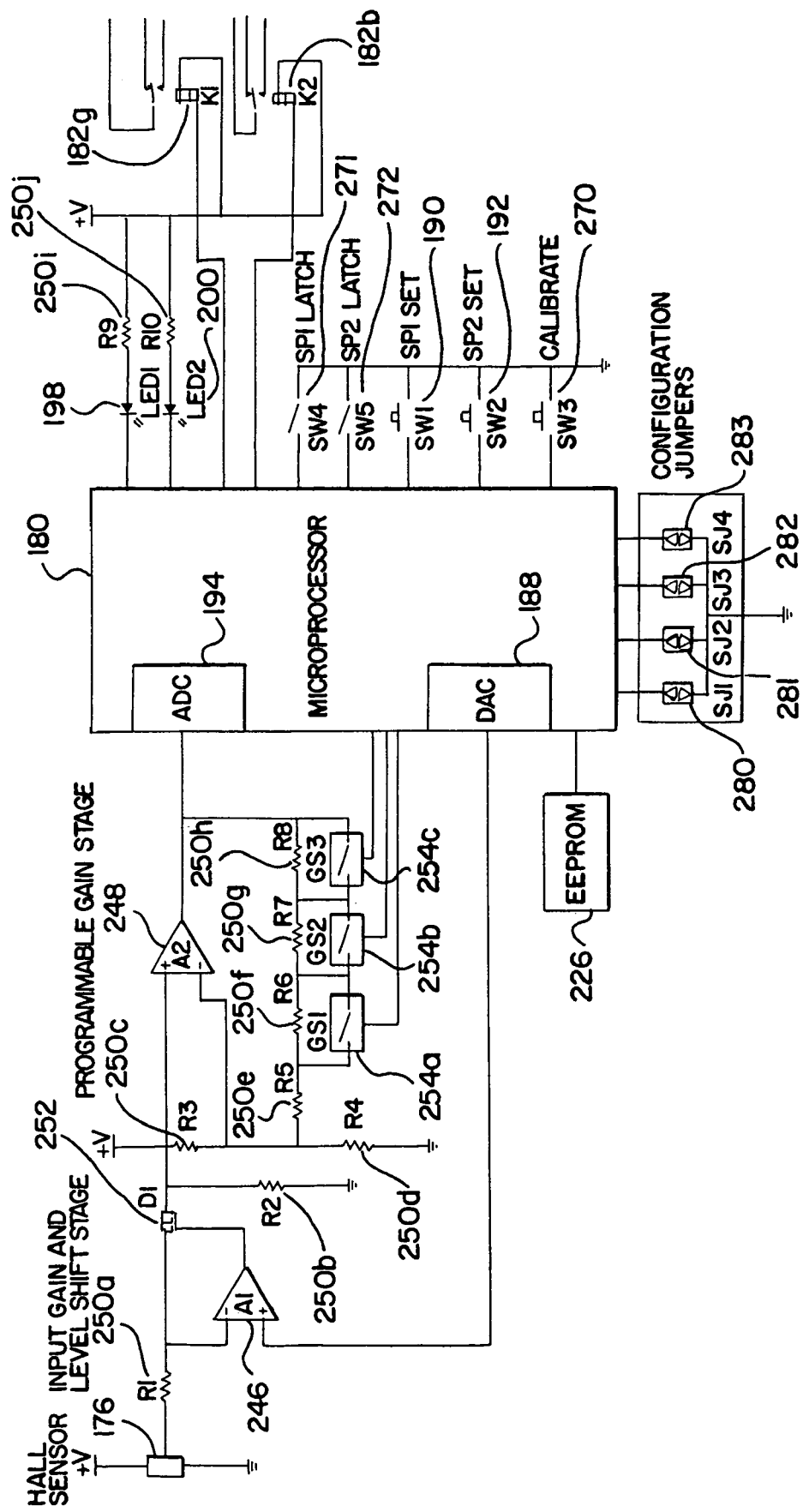
FIG. 17 is an electronic schematic of the electronic subsystem of the gage.

FIG. 17 illustrates a generalized schematic of the circuitry of the preferred embodiment. The PGA stage 186 illustrated in FIG. 16 is implemented in two stages consisting of operational amplifiers A1 246 and A2 248, resistors R1 250a, R2 250b, R3 250c, R4 250d, R5 250e, R6 250f, R7 250g, and R8 250h, transistor Q1 252, and switches GS1 254a, GS2 254b, GS3 254c. An example of suitable operational amplifiers are Model No. TLV2452CDGK as manufactured by Texas Instruments and examples of suitable transistors are Model 2N7002 as manufactured by Fairchild. The value of resistors 250a–h may be chosen to achieve the desired gain at each of the stages. Switches GS1 254a, GS2 254b, and GS3 254c are controlled by the microprocessor 180.

The switches and indicators block 196 illustrated in FIG. 16 includes switches SW1 190, SW2 192, SW3 270, SW4 271, SW5 272, and indicators LED1 198 and LED2 200, and their associated resistors R9 250i and R10 250j. The relay block 182 in FIG. 16 is implemented by relays K1 182a and K2 182b. In the schematic shown, the microprocessor 180 integrates the ADC and DAC components within the device itself. In addition, four configuration jumpers SJ1 280, SJ2 281, SJ3 282, and SJ4 283 are connected to inputs of the microprocessor 180. The configuration jumpers are used to select alternate operational modes.

To accommodate the signal provided by the Hall sensor 176, an first gain stage is used consisting of resistors R1 250a, R2 250b, transistor Q1 252, and operational amplifier A1 246 to remove any offset voltage of the Hall sensor 176 and provide a voltage level appropriate for the ADC 194. Operational amplifier A1 246, resistor R1 250a, and transistor Q1 252 interact to form a current source whose output current is passed through resistor R2 250b. The voltage created by the current flow through resistor R2 250b is proportional to the signal output of the Hall sensor 176, less the offset voltage. The DAC 226 provides to the operational amplifier 246, a voltage approximately equal to the offset voltage of the Hall sensor 176. By adjusting the DAC 226 output through the calibration process, the offset voltage of the Hall sensor and any system offsets can be accounted for.

A second programmable gain stage is provided by operational amplifier 248 A2, resistors 250c–h R3, R4, R5, R6, R7, R8, and switches 254a–c. Resistors 250c and 250d from the amplifier input resistance and produce an offset voltage that corresponds to a reference zero point for the ADC 248. Resistors 250e, 250f, 250g, and 250h form the amplifier feedback resistance. Switches GS1, GS2, GS3, 254a, b, c short the corresponding resistances. Those skilled in the art will see that by changing the switch states, the gain of the amplifier stage can be controlled. This is used by the span calibration process implemented within the microprocessor 180. The output of this stage is fed to the ADC 194 for conversion to a digital value usable by the microprocessor firmware.

The EEPROM 226 stores various calibration and configuration information, including programming to control the microprocessor outputs in response to the state of the inputs. Switches, indicators and relays are manipulated by the microprocessor to perform the functions described in the following paragraphs.

The operation of the microprocessor 180 may be divided into two basic states: calibration and operation. The calibration mode is initiated by activating switch SW3 270. In the preferred embodiment switch SW3 270 is an internal switching structure accessible to calibration and test equipment, although one will recognize that it may also be a switch located on the exterior of the housing, such as with SW1 190 and SW2 192. Calibration consists of first setting the meter pointer 168 to zero pressure then performing the zero operation. Initiation of the zero operation is done by activating switch SW1 190 while in the calibrate mode. This initiates a process, which successively changes the DAC 226 output while monitoring the measurement made by the ADC 194. The zero setpoint is achieved when the output of the ADC 194 is adjusted to a predetermined value. In the preferred embodiment, the valve is approximately 0.6 volts, which is used as a virtual setpoint, allowing the zero point to fall slightly below zero to accommodate tolerances in the system. Likewise the meter pointer 168 is set to full scale and a span calibration function is initiated by pressing SW2 192 while in the calibrate mode. Span calibration is performed by successively changing the settings of the gain switches 254a–c until the value measured by the ADC falls within a predetermined value range. In the preferred embodiment, the range of values is approximately 3.8 to 4.7 volts, which allows for tolerance within the system and provides sufficient resolution for operation. Other ranges may be appropriate depending upon the resolution desired, and the precision of the setting of the PGA stage 186 gain. In the calibration mode, the indicators 198A–B and 200A–B are used to indicate the state of the calibration process, which can be used by the operator or sensed through optical sensors by an automatic calibration system. When the calibration is complete, the value measured by the ADC 194 will fall within a range of values that correspond to the pressure measured by the mechanical pressure gauge.

In the operational mode, the pressure is continuously measured by the ADC 194. Operational mode is entered when SW3 270 is deactivated. The pressure value is compared with two setpoint values stored in EEPROM 226. These setpoint values may be selected by adjusting the gage to the desired pressure then pressing either SW1 190 to set the lower setpoint or SW2 192 to set the upper setpoint. When the switches are activated, the pressure measurement is stored in the corresponding setpoint address within the EEPROM 226. The indicators 198A–B and 200A–B and relays 182A–B are set to a state derived by a state machine implemented within the microprocessor firmware. In operation, the indicators 198A–B and 200A–B directly indicate the state of the relays, providing a visual indication of the state of the system.

The state machine controlling the relay 182A–B and indicator 198A–B and 200A–B outputs are identical for either setpoint 1 or setpoint 2. Each setpoint is controlled by the input value determined by comparing the setpoint value with the pressure value. If below the setpoint value, the input to the state machine is a logic zero, if above the setpoint value, it is a logic one. A latch function is provided and is controlled by a latch input. The latch inputs are represented by switches SW4 271, SW2 272, which are located external to the housing described herein. One skilled in the art will recognize that the switches may be placed on or within the housing as well. Configuration of the state machine is implemented by configuration jumpers 280, 281, and 283. Jumpers 280 and 281 are used for set point 1 and jumpers 282 and 283 are used for setpoint 2. By setting the jumpers, one can determine whether a latch occurs on an output value of 0 or 1, and whether the output is normal or inverted. A normal output would be off when the input value is 0 and on when it is 1. If inverted, the output will be on when the input is 0 and off when the input is 1. The latch function will hold an output value when the input transitions to the active level and will hold that value thereafter regardless of the input value until the latch is reset by the latch input. Table 1 illustrates the logic implemented by the state machine.

TABLE 1

State Machine Logic

| In | L | LH/LL | I | Output |
|----|---|-------|---|--------|
| 0  | 0 | X     | 0 | 0      |
| 1  | 0 | X     | 0 | 1      |
| 0  | 0 | X     | 1 | 1      |
| 1  | 0 | X     | 1 | 0      |
| 0  | 1 | 0     | 0 | 0      |
| U  | 1 | 0     | 0 | 1      |
| D  | 1 | 0     | 0 | 1      |
| 0  | D | 0     | 0 | 0      |
| 0  | 1 | 1     | 0 | 0      |
| U  | 1 | 1     | 0 | 0      |
| 1  | D | 1     | 0 | 1      |

Where 0 corresponds to logic zero, 1 corresponds to logic one, U corresponds to a transition from zero to one, D corresponds to a transition from one to zero, and X may be either one or zero without affecting the output value. Input value is zero when the input is below the setpoint value and one when it is above. The latch input control, L, is inactive when zero and active when one. Whether the latched value is one or zero is controlled by the configuration setting "LH/LL" representing latch high or latch low. The output directly corresponds to the input when the invert configuration setting "I" is zero and it is inverted when "I" is one.

The operation of the system can be visualized by examining Table 1. The latch is inactive when L is 0. In this case the output can be seen to directly correspond to the input when the invert control I is zero and correspond to the inverse of the input when I is one. This normal/invert operation is independent of the latch operation therefore the inversion is not illustrated for the latching portion of the table.

The latch is enabled when the latch input L is set to 1. The latch level configuration input LH/LL causes the output to latch on one when it is zero and the output will latch on zero when LH/LL is one. With L set to one, the output will remain at zero until the input transitions from zero to one. When it transitions back to zero, the output will remain at one. To reset the latch the latch input L is transitions to zero as shown in the table. When the LH/LL input is set to one, the output will latch at zero until the latch input L transitions to zero. The output of the state machine controls the condition of relays 182*a–b* and LED's 198 and 200. In the preferred embodiment, a state machine output, for set point 1, of 0 will cause LED 198 and relay 182*a* to be off, and an output of 1 will cause the LED 198 and relay 182*a* to be on. Likewise, a state machine output, for setpoint 2, of 0 will causes LED 200 and relay 182*b* to be off, and an output of 1 will cause the LED 200 and relay 182*b* to be on. One will recognize that LEDs 198 and 200 in the electrical schematic of FIG. 17 can include multiple LED's, such as LED's 198A and B and 200A and B shown in other figures.

The gage 20 includes an over pressure regulator 204 as best shown in FIG. 10. The regulator 204 includes a stop member such as a plate 206, and a threaded stud 208 attached to the plate 206. A hollow bore 210 extends through the center of the stud 208 and through the plate 206. The stud 208 is located within the bore of the first fluid conduit 80 of the back plate 36 and is threadably attached thereto. The outer end of the stud 208 includes a recess, such as a slot, that is adapted to receive a tool, such as a screw driver. The position of the over pressure regulator 204 with respect to the back plate 36 and to the diaphragm 120 can be selectively adjusted by inserting a screw driver through the inlet port 86 of the first fluid conduit 80 and into the recess of the stud 208. Appropriate rotation of the stud 208 will move the plate 206 closer to, or farther from, the diaphragm 120 as desired. When the diaphragm 120 is subjected to an overpressure situation, the pressure of the fluid within the second fluid pressure chamber 130 will move the diaphragm 120 and the linkage 126 toward the back plate 36. The linkage 126 will engage the plate 206 of the over pressure regulator 204 to prevent further movement of the diaphragm 120 and linkage 126 toward the back plate 36 when the selected over pressure setting is reached. Corresponding movement of the magnet 150 will also be stopped. The over pressure regulator 204 thereby prevents the magnet 150 from traveling past and out of range of the Hall effect sensor in an over pressure situation, wherein the Hall effect sensor may otherwise send a signal incorrectly indicating that there is no pressure being sensed by the gage 20, or indicating an incorrect pressure being sensed. The bore 210 of the over pressure regulator 204 provides fluid communication between the inlet port 86 of the first fluid conduit 80 and the first fluid pressure chamber 128.

The cover 34 of the pressure gage 20 includes a ribbed peripheral circular edge that surrounds a clear lens 212. The cover 34 also includes a generally circular rim 214 that is adapted to fit within a generally circular wall 216 in the first end 30 of the head housing 28. A plurality of tabs 218 are attached to and extend outwardly from the rim 214. The cover 34 also includes an annular groove 220 that is adapted to receive a resilient seal member 222 such as an O-ring. The seal member 222 is adapted to create a seal between the circular wall 216 of the head housing 28 and the cover 34.

The wall 216 of the head housing 28 includes a plurality of generally L-shaped slots 224. Each L-shaped slot 224 is adapted to receive a respective tab 218 of the cover 34. The tabs 218 are inserted into the outer openings of the L-shaped slots 224 and are moved inwardly to the transverse portions of the L-shaped slots 224, wherein the cover 34 is rotated to locate the tabs 218 in the inner ends of the L-shaped slots 224. The L-shaped slots 224 thereby prevent the tabs 218 from moving parallel to the longitudinal axis of the gage 20 to thereby releasably connect the cover 34 to the head housing 28.

Figure 4:
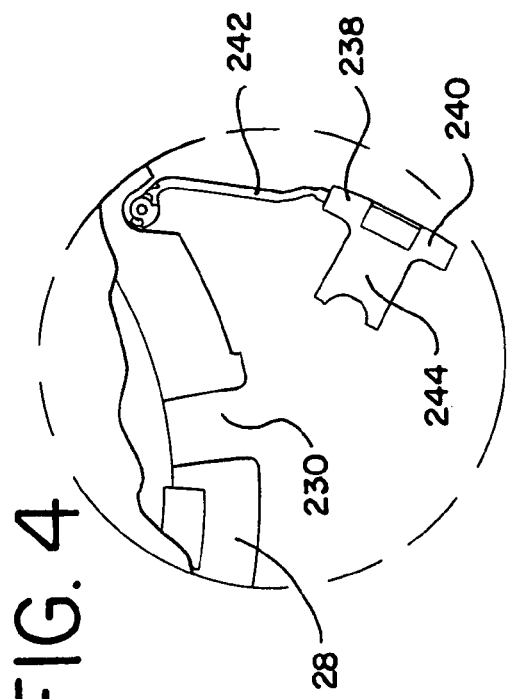
FIG. 4 is an enlarged detail view of the locking clip of the present invention as also shown in FIG. 3.
Figure 11:
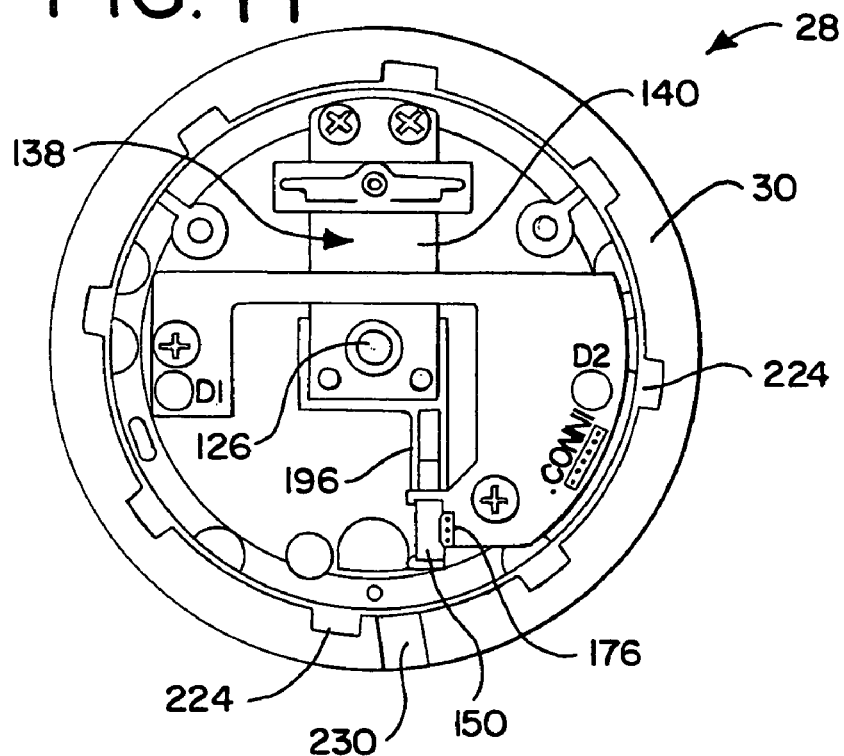
FIG. 11 is a front elevational view of the gage head housing shown with the pointer and helix removed.
Figure 12:
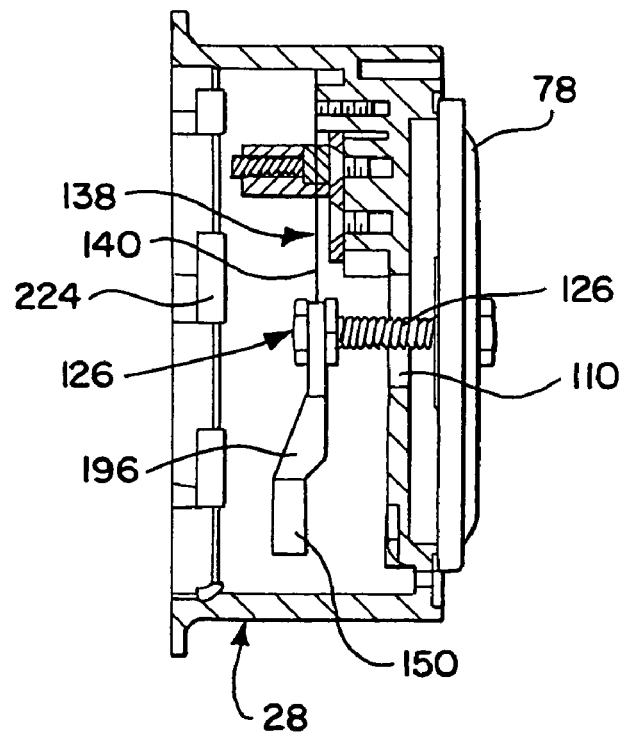
FIG. 12 is a cross sectional view through the gage head housing.

As best shown in FIG. 11, the first end 30 of the head housing 28 includes a recess 230. As best shown in FIG. 10, the rim 214 of the cover 34 also includes a recess 232. The recesses 230 and 232 are adapted to be aligned and in communication with one another when the cover 34 is properly attached to the head housing 28. A locking clip 238 is pivotally attached to the first end 30 of the head housing 28. The locking clip 238 includes a head 240 attached to an arm 242. The arm 242 is pivotally attached to the head housing 28. The head 240 includes a tip member 244 that is adapted to be inserted into both recesses 230 and 232 when the cover 34 is properly attached to the head housing 28. The tip member 244 thereby prevents rotation of the cover 34 with respect to the head housing 28 such that the cover 34 cannot be removed from the head housing 28. The locking clip 238 can be selectively pivoted from the locked position to a retracted position wherein the tip member 44 is located outside of the recesses 230 and 232, such as shown in FIG. 4, whereby the cover 34 can be rotated with respect to the head housing 28 for removal therefrom.

The gage 20 senses, measures, indicates and controls positive, negative and differential pressures, preferably in the range of approximately zero to approximately one-half inch water differential (IWD) or approximately zero to approximately fifteen pounds per square inch differential (PSID). The maximum pressure rating for the gage 20 is approximately thirty pounds per square inch (PSI).

Various features of the invention have been particularly shown and described in connection with the illustrated embodiment of the invention, however, it must be understood that these particular arrangements merely illustrate, and that the invention is to be given its fullest interpretation within the terms of the appended claims.

What is claimed is:

1. A pressure gage adapted to provide a mechanical indication of a sensed pressure and to provide an electrical signal indicative of the sensed pressure, said pressure gage comprising:

a first inlet port adapted to be placed in fluid communication with a first fluid source;

a second inlet port adapted to be placed in fluid communication with a second fluid source;

a housing including a first fluid pressure chamber in fluid communication with said first inlet port, a second fluid pressure chamber in fluid communication with said second inlet port, and a flexible diaphragm separating said second fluid pressure chamber from said first fluid pressure chamber;

a magnet coupled to said diaphragm such that movement of said diaphragm causes a related movement of said magnet;

a helix located adjacent said magnet, said helix adapted to rotate about an axis;

a pointer attached to said helix for conjoint rotation with said helix about said axis; and a Hall effect sensor located adjacent said magnet;

whereby movement of said magnet in response to movement of said diaphragm rotates said helix and said pointer to provide a mechanical indication of the pressure sensed by said diaphragm, and said movement of said magnet causes said Hall effect sensor to generate an electrical signal indicative of the pressure sensed by said diaphragm.

2. The pressure gage of clam 1 wherein said housing includes a head housing and a back plate attached to said head housing, said diaphragm including a peripheral edge located between said head housing and said back plate, said first fluid pressure chamber being located between said diaphragm and said back plate and said second fluid pressure chamber being located between said diaphragm and said head housing.

3. The pressure gage of claim 2 wherein said back plate includes a fluid conduit having a first end and a second end, said first inlet port being in fluid communication with said fluid conduit, said fluid conduit being in fluid communication with said first fluid pressure chamber.

4. The pressure gage of claim 3 including an over pressure regulator, said over pressure regulator including a stud located within and movably attached to said fluid conduit of said back plate, and a stop member attached to said stud and located in said first fluid pressure chamber, said stop member being selectively positionable with respect to said diaphragm such that said stop member is adapted to prevent movement of said diaphragm beyond a selected position to prevent said diaphragm from moving said magnet beyond a selected position.

5. The pressure gage of claim 1 including a leaf spring attached at a first end to said housing, said magnet attached to a second end of said leaf spring, and a linkage coupling said leaf spring to said diaphragm, whereby movement of said diaphragm provides a related movement of said magnet through said linkage.

6. The pressure gage of claim 1 wherein said magnet is located between said helix and said Hall effect sensor.

7. The pressure gage of claim 1 wherein said housing includes an outer circumference, and one or more connector members attached to said housing, each connector member including a first end pivotally attached to said housing and a second end adapted to be attached to a structure, each said connector member being selectively pivotal between an outwardly extended position wherein said second end of said connector member is located outwardly beyond said outer circumference of said housing for attachment to the structure, and a retracted position wherein said connector member does not extend outwardly beyond said outer circumference of said housing.

8. The pressure gage of claim 1 including a cover removably attached to said housing, said cover including a lens and a generally circular rim, said rim including a plurality of outwardly extending tabs and a first recess, said housing including a generally circular wall adapted to removably receive said rim of said cover, said circular wall of said housing including a plurality of generally L-shaped slots, each slot adapted to receive a respective tab of said cover and thereby connect said cover to said housing, said circular wall of said housing including a second recess that is adapted to align with said first recess of said cover, and a locking clip adapted to be removably inserted into said first and second recesses to prevent rotation of said cover with respect to said housing, said locking clip being selectively removable from said first and second recesses to allow rotation of said cover with respect to said housing.

9. The pressure gage of claim 2 including a body housing attached to said back plate, said body housing including a first fluid conduit providing fluid communication between said inlet port and said fluid passage of said back plate, and a second fluid conduit providing fluid communication between said second inlet port and said second fluid pressure chamber.

10. The pressure gage of claim 1 including a relay and a switch, the switch adapted to be manually activated to select a pressure at which the relay will activate when the Hall effect sensor sends an electrical signal corresponding to the selected pressure.

11. The pressure gage of claim 10 including a first pressure point indicator located on a face plate at a first end of said housing, and a second pressure point indicator located at a second end of said housing, said first and second pressure point indicators adapted to indicate when the pressure selected with said pressure set point switch has been sensed.

12. The pressure gage of claim 1, further including means for selecting a pressure setting.

13. The pressure gage of claim 12, further including means for amplifying the signal generated by the Hall effect sensor, and means for controlling relays.

14. The pressure gage of claim 1, further including:
an amplifier for amplifying the signal generated by the Hall effect sensor;
memory for storing pressure set point values; and
a microprocessor adapted to compare the amplified signal with said pressure set point values.

15. The pressure gage of claim 14 further including a relay electrically connected to said microprocessor, said microprocessor actuating said relay in response to the pressure set point values and the signal generated by the Hall effect sensor.

16. The pressure sensor of claim 1, further including:
means for amplifying said signal generated by the Hall effect sensor;
means for setting and means for storing a pressure set point value;
means for comparing said Hall effect sensor signal and said stored pressure set point value, and
means for activating an electric circuit in response to the result of the comparison.

17. The pressure gage of claim 14, further including an indicator for visually displaying the state of the relay.

18. The pressure gage of claim 1, further including:
a first amplifier stage electrically connected to the Hall effect sensor;
a second amplifier stage electrically connected to the first amplifier stage, the gain of the second stage being selectable by the user of the gage;
a microprocessor electrically connected to the second amplifier stage to receive an amplified signal;
a memory electrically connected to said microprocessor, said memory storing a pressure set point value; and
a relay electrically connected to said microprocessor, said microprocessor controlling the state of the relay in response to a comparison between the amplified signal and the stored pressure set point value.

19. The pressure gage of claim 18, further including a visual indicator for indicating the state of the relay.

* * * * *